US012792958B2

(12) United States Patent
Gottin et al.

(10) Patent No.: US 12,792,958 B2
(45) Date of Patent: Nov. 10, 2026

(54) ROBUST AGGREGATION FOR FEDERATED DATASET DISTILLATION

(71) Applicant: Dell Products L.P., Round Rock, TX (US)

(72) Inventors: Vinicius Michel Gottin, Rio de Janeiro (BR); Paulo Abelha Ferreira, Rio de Janeiro (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 890 days.

(21) Appl. No.: 18/157,966

(22) Filed: Jan. 23, 2023

(65) Prior Publication Data

US 2024/0249185 A1 Jul. 25, 2024

(51) Int. Cl.
*G06N 20/00* (2019.01)

(52) U.S. Cl.
CPC .................................... *G06N 20/00* (2019.01)

(58) Field of Classification Search
CPC ............................... G06N 3/098; G06N 20/00
See application file for complete search history.

(56) References Cited

U.S. PATENT DOCUMENTS

2018/0240011 A1* 8/2018 Tan ......................... G06F 17/18
2020/0302292 A1 9/2020 Tseng et al.
2021/0182661 A1* 6/2021 Li .......................... G06N 3/096
2021/0406683 A1* 12/2021 Kai ....................... G06F 18/211
2023/0122139 A1 4/2023 Ferreira et al.
2023/0169333 A1* 6/2023 Choi ........................ G06N 3/08
2024/0152649 A1* 5/2024 Kao .................... G06F 21/6245

OTHER PUBLICATIONS

Ghosh, Avishek, et al. "An efficient framework for clustered federated learning." Advances in neural information processing systems 33 (2020): 19586-19597. (Year: 2020).*

Wang, Tongzhou, et al. "Dataset distillation." arXiv preprint arXiv:1811.10959v3 (2020). https://doi.org/10.48550/arXiv.1811.10959 ( Year: 2020).*

Hu, Li, et al. "MHAT: An efficient model-heterogenous aggregation training scheme for federated learning." Information Sciences 560 (2021): 493-503. (Year: 2021).*

(Continued)

*Primary Examiner* — Vincent Gonzales
*Assistant Examiner* — Pedro J Morales
(74) *Attorney, Agent, or Firm* — Workman Nydegger

(57) ABSTRACT

Robust federated dataset distillation is disclosed. A model (or models) is optimized with a distilled dataset at a central node. The models or model weights are transmitted to nodes, which generate loss evaluations by using the optimized models on real data. The loss evaluations are returned to the central node. The loss evaluations are robustly aggregated to generate an average loss. Robust aggregation allows outliers or suspect loss evaluations to be excluded. Once the outliers or suspect loss evaluations are excluded, an update, which may include gradients, is applied to the distilled dataset and the process is repeated. The distilled dataset can be used at least when deploying a model to a new node that may not have sufficient data to train the model or for other reasons.

20 Claims, 12 Drawing Sheets

(56) References Cited

OTHER PUBLICATIONS

Liu, Zhetong, et al. "Federal SNN distillation: A low-communication-cost federated learning framework for spiking neural networks." Journal of Physics: Conference Series. vol. 2216. No. 1. IOP Publishing, 2022. (Year: 2022).*
Chennupati et al., "Adaptive Distillation: Aggregating Knowledge from Multiple Paths for Efficient Distillation", Oct. 19, 2021, v1, pp. 1-14 (Year: 2021).
Hao et al., "Towards Fair Federated Learning with Zero-Shot Data Augmentation", Jun. 25, 2021, Proceedings of the IEEE/CVF conference on computer vision and pattern recognition, vol. 2021, pp. 3310-3319 (Year: 2021).
Daliang Li, Junpu Wang, "FedMD: Heterogenous Federated Learning via Model Distillation", Oct. 8, 2019, arXiv:1910.03581 [cs.LG], NeurIPS 2019 Workshop on Federated Learning for Data Privacy and Confidentiality.
T. Wang, J. Zhu, A. Torralba and A. Efros, "Dataset distillation," arXiv, vol. preprint arXiv:1811.10959, 2018.
Asad et al., "Evaluating the Communication Efficiency in Federated Learning Algorithms", 2021, 2021 IEEE 24th International Conference on Computer Supported Cooperative Work in Design (CSCWD), vol. 24 (2021), pp. 552-557 (Year: 2021).
Goetz et al., "Federated Learning via Synthetic Data", 2020, arXiv, v2, pp. 1-12 (Year: 2020).
Nilsson et al., "A Performance Evaluation of Federated Learning Algorithms", 2018, DIDL '18: Proceedings of the Second Workshop on Distributed Infrastructures for Deep Learning, vol. 2018, pp. 1-8 (Year: 2018).
Sucholutsky et al., "Soft-Label Dataset Distillation and Text Dataset Distillation", Jul. 22, 2021, 2021 International Joint Conference on Neural Networks (IJCNN), vol. 2021, pp. 1-8 (Year: 2021).
Yufeng, "The 7 Steps of Machine Learning", 2017, retrieved from https://towardsdatascience.com/the-7-steps-of-machine-learning-2877d7e5548e on Oct. 21, 2024 (Year: 2017).
Zhao et al., "Dataset Condensation with Gradient Matching", Mar. 8, 2021, arXiv, v3, pp. 1-20 (Year: 2021).
Zhou et al., "Distilled One-Shot Federated Learning", Jun. 6, 2021, arXiv, v3, pp. 1-16 (Year: 2021).

* cited by examiner

200

Dataset Distillation

T: Number of dataset distillation rounds
M: Number of elements in distilled dataset
D: Dimensionality of distilled dataset
I: Number of sampled models
E: Number of model optimization epochs $\tilde{x} \leftarrow init\_distilled\_data(M, D)$ 202
$\tilde{\eta} \leftarrow \tilde{\eta}_0$
for $t = 1$ to $T$ do
  $x \sim p(X)$
  for $i = i$ to $I$
    $\theta_1^i \sim p(\theta)$ 204
    for $e = 1$ to $E$ do
      $\theta_{e+1}^i \leftarrow -\tilde{\eta} \nabla_{\theta_e^i} \ell(\tilde{x}, \theta_e^i)$
    $L_i \leftarrow \ell(x, \theta_E^i)$ 206
  $\tilde{x} \leftarrow \tilde{x} - \alpha \sum_i \nabla_{\tilde{x}} L_i$ 208
  $\tilde{\eta} \leftarrow \tilde{\eta} - \alpha \sum_i \nabla_{\tilde{\eta}} L_i$
return $\tilde{x}, \tilde{\eta}$

Figure 2A

220

| Symbol (222) | Meaning (224) | Initialization (202) | Model Optimization (204) | Loss Evaluation (206) | Gradient Computation (208) |
|---|---|---|---|---|---|
| $\tilde{x}$ | Distilled dataset | | | | |
| x | Real data | | | | |
| $p(\theta)$ | Model distribution for initialization | | | | |
| $\theta_1^i$ | The $i$-th model parameters sampled from $p(\theta)$; the $i$-th model before optimization step | | | | |
| $\theta_E^i$ | The $i$-th model after optimization step after E epochs (the optimized model) | | | | |
| $l$ | The loss function | | | | |
| $L_i$ | The loss obtained from the loss function | | | | |
| $\tilde{\eta}$ | Distillation learning rate | | | | |
| $\tilde{\eta}_0$ | Initial learning rate parametrized | | | | |

Figure 2B

500

```
# Iterative Robust Federated Dataset Distillation (IR-FDD)
# Model optimization:          Central        504
# Loss computation:            Edge               506
# Distillation optimization:   Central        508
T: Number of dataset distillation rounds
M: Number of elements in distilled dataset
D: Dimensionality of distilled dataset
I: Number of sampled models
E: Number of model optimization epochs
R: Central structure mapping (node, model) to loss

x̃ ← init_distilled_data(M,D)
η̃ ← η̃_0                                          502
for t = 1 to T do
    for i = 1 to I do
        θ^i_1 ~ p(θ)                                504
        for e = 1 to E do
            θ^i_{e+1} ← −η̃ ∇_{θ^i_e} ℓ(x̃, θ^i_e)
    Z ← nodes_eval
    while Z ≠ ∅:
        for each (i, j) in Z
          communicate θ^i_E to edge node j
          x_i ~ p(X_i)
          L^i_j ← ℓ(x_i, θ^i_E)                     506
          communicate L^i_j to central node          510
        Z ← nodes_eval
   Aggregate all L^i_j into R
    ∇_x̃ℒ, ∇_x̃η ← robust_aggregation(R)             508
    x̃ ← x̃ − α Σ_i ∇_x̃ ℒ_i
    η̃ ← η̃ − α Σ_i ∇_η̃ ℒ_i
 return x̃, η̃
```

Figure 5

ROBUST AGGREGATION FOR FEDERATED DATASET DISTILLATION

FIELD OF THE INVENTION

Embodiments of the present invention generally relate to machine learning and distilled datasets. More particularly, at least some embodiments of the invention relate to systems, hardware, software, computer-readable media, and methods for generating distilled datasets for training machine learning models.

BACKGROUND

Performing machine learning in a distributed and/or federated manner can be complicated. For example, performing machine learning tasks at the edge requires handling massive amounts of data and dealing with thousands, if not millions, of nodes that are each training models and generating inferences. For example, self-driving vehicles is an example where each node deals with its own data stream, which is large in terms of duration and dimensionality.

There are situations where it may be desirable to deploy a common machine learning model to all (or at least a subgroup) nodes such that the models can be fine-tuned at each of the nodes. Because the same model is deployed to a large number of nodes, it is advantageous to ensure that the models are aligned and up to date with respect to data at each of the nodes. This helps ensure that the model, once the learning has been federated, can generalize to future data and to new nodes to which the model may be deployed.

To enable the ability to train and deploy machine learning models to edge nodes in a dynamic manner while preserving privacy, it may be possible to rely on a distilled dataset. A distilled dataset can reduce transfer requirements between the edge and the cloud, preserve privacy (data is not shared between nodes) and reduce storage requirements at the nodes. However, generating a distilled dataset that is sufficient for federated learning requirements remains a difficult task.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2A discloses aspects of generating a distilled dataset;

FIG. 2B discloses a table of symbols included in FIG. 2A;

FIG. 5 discloses aspects of generating a distilled dataset with robust aggregation;

DETAILED DESCRIPTION OF SOME EXAMPLE EMBODIMENTS

Embodiments of the present invention generally relate to federated machine learning, federated distilled datasets, and training machine learning models. More particularly, at least some embodiments of the invention relate to systems, hardware, software, computer-readable media, and methods for robustly aggregated federated dataset distillation and federated machine learning training.

In general, example embodiments of the invention relate to providing a distilled dataset for training machine learning models in edge environments. Embodiments of the invention further relate to obtaining or generating a distilled dataset $\tilde{x}$ that is generalized while ensuring coherence (e.g., with respect to drift, malicious attacks, or other deviations) from multiple edge nodes.

Embodiments of the invention further relate to robust aggregation in the context of generating distilled datasets and machine learning model training. Robust aggregation, for example, may determine whether a particular set up updates (e.g., gradients) should be kept or discarded in order to ensure and/or preserve the coherence of the federated training.

The efficiency of deploying machine learning models, particularly to dynamically added nodes, is affected by the amount of data transferred to the nodes, the amount of data required to be stored for training, and the time required for training. Embodiments of the invention save costs and communication overhead by reducing pre-deployment training and fine-tuning training at the edge nodes. Embodiments of the invention also enable fine-tuning in low compute nodes. To achieve these goals and efficiencies, embodiments of the invention generate and/or manage a distilled dataset.

A distilled dataset is a dataset that can be used to train machine learning models. A distilled dataset is often synthetic in nature in the sense that the initial data may be synthetic or random. Once generated, however, a distilled training dataset is substantially smaller than a conventional training dataset and is distinct from a small sample of a training dataset. A distilled dataset is more likely to ensure that the ability of machine learning models to generate sufficiently accurate inferences is generalized. The distilled dataset should be representative of the data from as many nodes as possible.

However, there is no guarantee of homogeneity in the distributions of data collected at the edge nodes and adding nodes to a federated environment increases the chance of acquiring data that has a different distribution. Embodiments of the invention generate a generalized distilled dataset that can adapt to different data distributions. Embodiments of the invention further ensure that malicious updates to the distilled dataset and/or the model are avoided or removed by robustly aggregating the updates to the distilled dataset and/or updates to the machine learning model.

Figure 1:
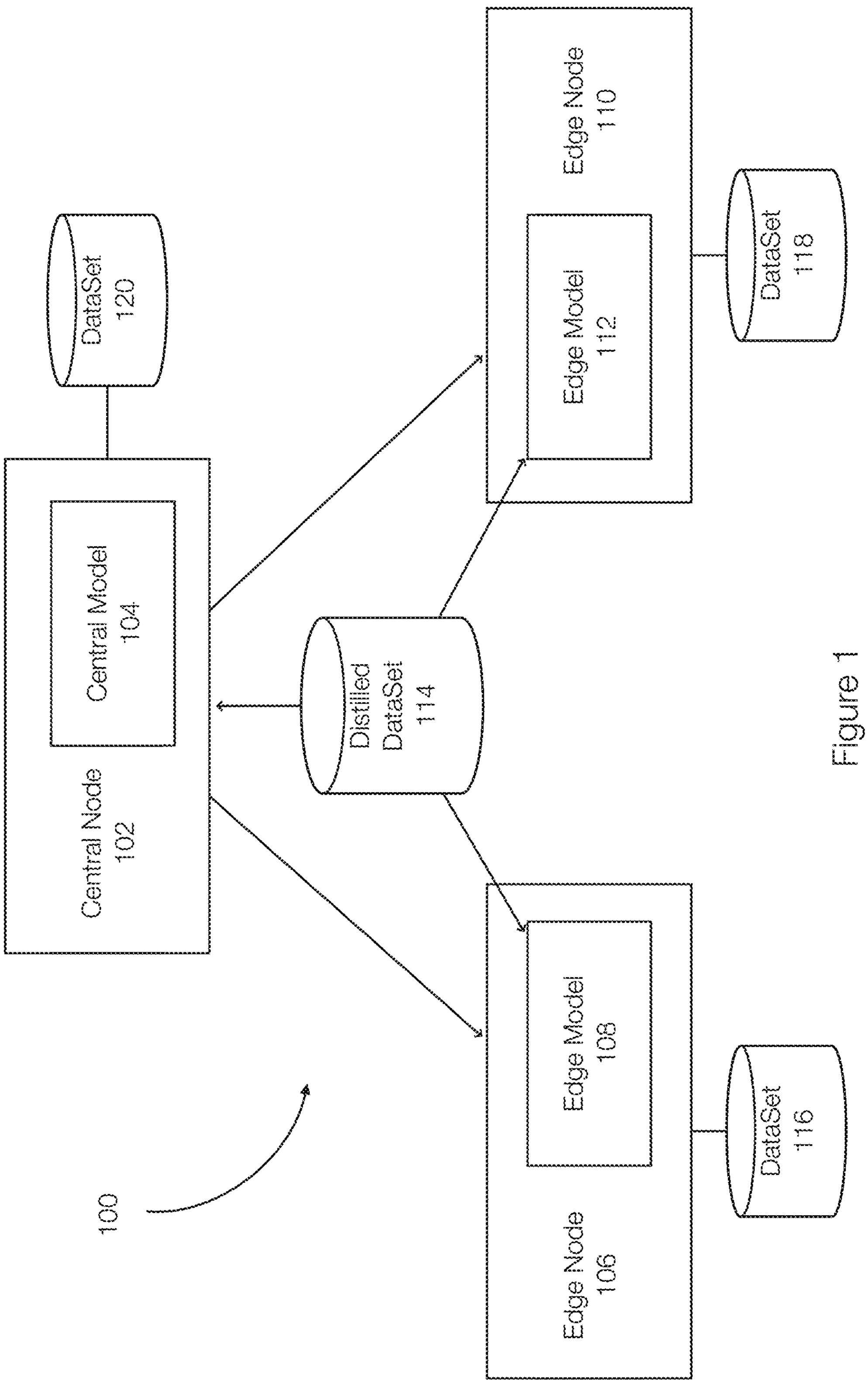
FIG. 1 discloses aspects of federated learning and of training federated machine learning models with a distilled data set.

FIG. 1 discloses aspects of federated machine learning and of training models in a federated machine learning system. The system 100 includes a central node 102 that may be associated with multiple edge nodes, represented by nodes 106 and 110. The central node 102 may be a datacenter or in the cloud and may include hardware such as processors, memory, networking hardware, and the like. The central node 102 may include storage devices configured to store data, machine learning models and the like. The nodes 106 and 110 may be similarly configured but are placed or located on the edge. The nodes 106 and 110, for example, may be closer to user devices or the like. The nodes 106 and 112 may also represent multiple devices or systems.

The node 106 includes an edge model 108 that is a copy of the central model 104. The node 110 may include an edge model 112 that is a copy of the central model 104. The models 108 and 112, once trained, may operate using, respectively, local datasets 116 and 118. More specifically, the edge model 108 may generate inferences or predictions using the dataset 116 or data associated with the node 106 specifically. The edge model 112 may be fine-tuned during training using the dataset 118, which includes data associated with the node 110 specifically. The central node 102 may use a dataset 120, which may represent data from all of the nodes in the system 100.

Conventionally, the central model 104 may be trained using a training dataset such as the dataset 120. The central model 104, once trained, is distributed to the nodes 106 and 110 as the edge models 108 and 112. Additional training or fine-tuning may be performed at the nodes 106 and 110. The central node 102 may receive updates from the edge nodes 106 and 110. The model 104 is updated using the updates from the nodes 106 and 110. The global update is then distributed back to the nodes 106 and 110. This process may continue until convergence is achieved.

Embodiments of the invention also perform aspects of federated learning using a distilled dataset 114. Further embodiments of the invention may perform aspects of federated learning at the central node 102 and/or at the edge nodes 106 and 110.

Generally, dataset distillation is a process of generating a synthetic dataset that can be used to train a machine learning model. The distilled dataset 114 is smaller in size compared to a conventional training dataset. Embodiments of the invention relate to generating the distilled dataset 114 such that the distilled dataset 114 is generalized to the nodes in the system 100 and such that the distilled dataset 114 can be deployed to new nodes for training purposes. A model trained on the distilled dataset may have an accuracy that is comparable to being trained with a conventional dataset and such that the newly trained node is suitable for production purposes.

FIG. 2A discloses aspects of generating a distilled dataset and FIG. 2B illustrates a table of symbols. More specifically, FIG. 2A discloses pseudocode 200, which is configured to generate a distilled dataset and the table 220 defines the symbols 222 and the meaning 224 of some of the symbols in the pseudocode 200 and elsewhere herein. Generally, the process of generating a distilled dataset is performed through a double optimization process that begins with a synthetic random dataset (e.g., white noise images).

More specifically, a model is initially optimized with a known real dataset. After the model is optimized using the real dataset, a loss is calculated or determined for the synthetic dataset (e.g., by running the synthetic dataset through the model optimized on the known real dataset). Further optimization is performed with respect to the synthesized dataset based on the calculated loss in order to generate the distilled dataset. Many models may be sampled in order to obtain a distilled dataset that is robust to in-distribution changes to a family of models.

The pseudocode 200 describes a method for generating a distilled dataset. The elements 202, 204, 206, and 208 of the method are also referenced in FIG. 2B to illustrate which symbols are associated with which aspects of the generating the distilled dataset. Generally, the process of generating a distilled dataset includes various steps or stages that may include: distilled dataset initialization, model optimization, distillation gradient computation, and distillation optimization.

An example method includes creating or initializing 202 a distilled dataset and an initial learning rate. After the distilled dataset and learning rate are initialized 202 or created, the model is optimized 204 for T distillation rounds. Next, the loss is evaluated or determined 206. Stated differently, a gradient computation is performed. Finally, the gradients are optimized 208. This includes updating the distilled dataset and the learning rate. After the T distillation rounds, the optimized distilled dataset and learning rate are returned.

Figure 3:
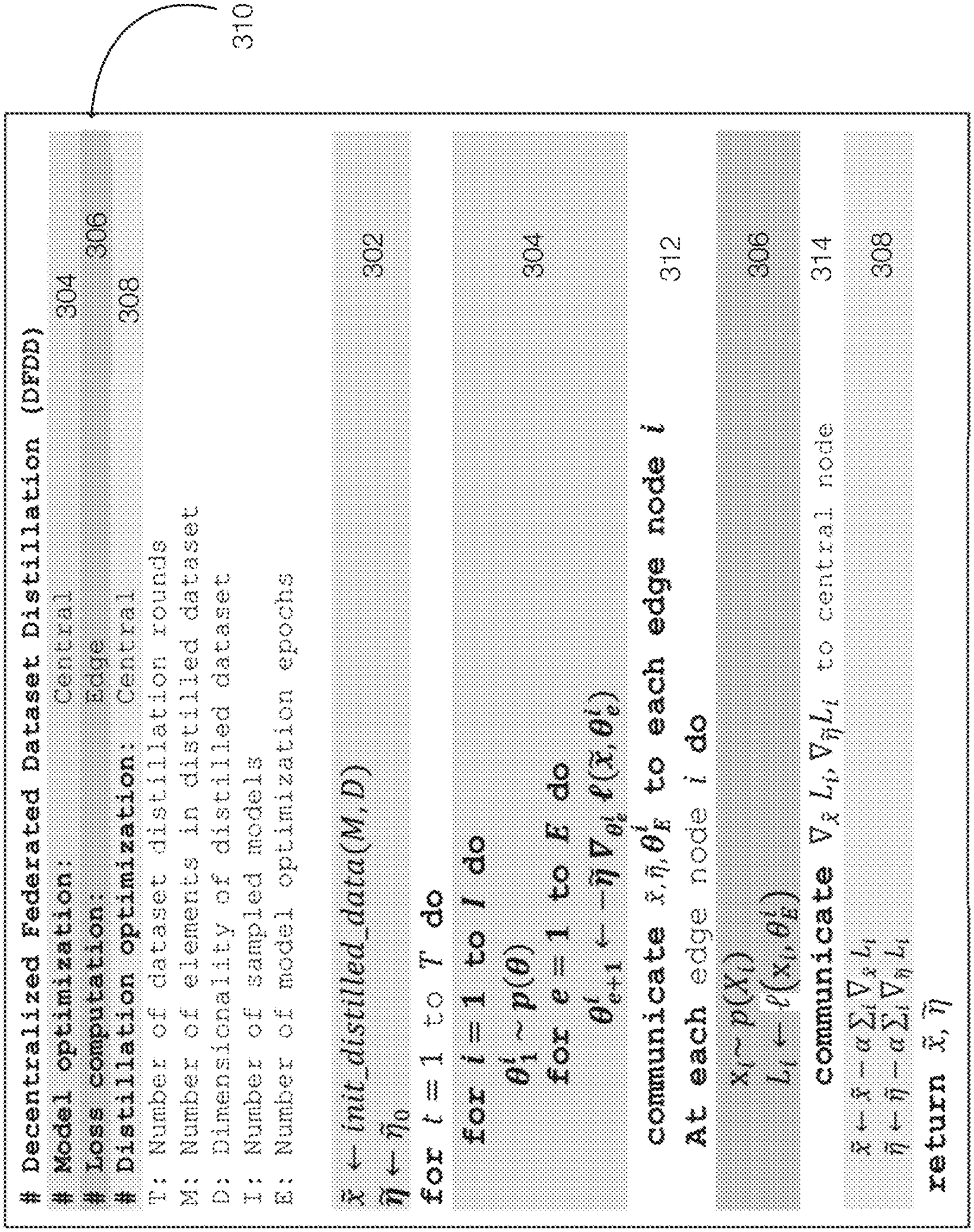
FIG. 3 discloses aspects of generating a federated distilled dataset.

FIG. 3 discloses additional aspects of federated dataset distillation. FIG. 3 thus expands on the process of FIG. 2A by introducing aspects of federated learning into the process of generating a federated distilled dataset. The pseudocode 300 thus describes a method for performing federated dataset distillation.

As shown at 310, generating the federated distilled dataset includes aspects that are performed at different locations. In this specifical example, model optimization 304 is performed centrally (e.g., at the central node), the loss computation 306 is performed at the edge (e.g., at the edge nodes) and the distillation optimization 308 is performed centrally at the central node. Embodiments of the invention may perform these aspects at different locations. Thus, the model optimization, the loss computation, and the distillation optimization can each be performed centrally at the central node or at the edge nodes. Multiple combinations are possible. FIG. 3 illustrates a specific combination.

FIG. 3 further illustrates that, after the model is optimized 304, the distilled dataset, the learning rate, and the optimized model are communicated 312 to each of the edge nodes. After the loss is determined 306 at each of the edge nodes using local real data ($x_{¿}$), the gradients are communicated 314 back to the central node. More specifically, each edge node in FIG. 3 receives one optimized model for loss evaluation in a distillation round t. The edge nodes also receive the current distilled dataset and learning rate for that computation.

Figure 4:
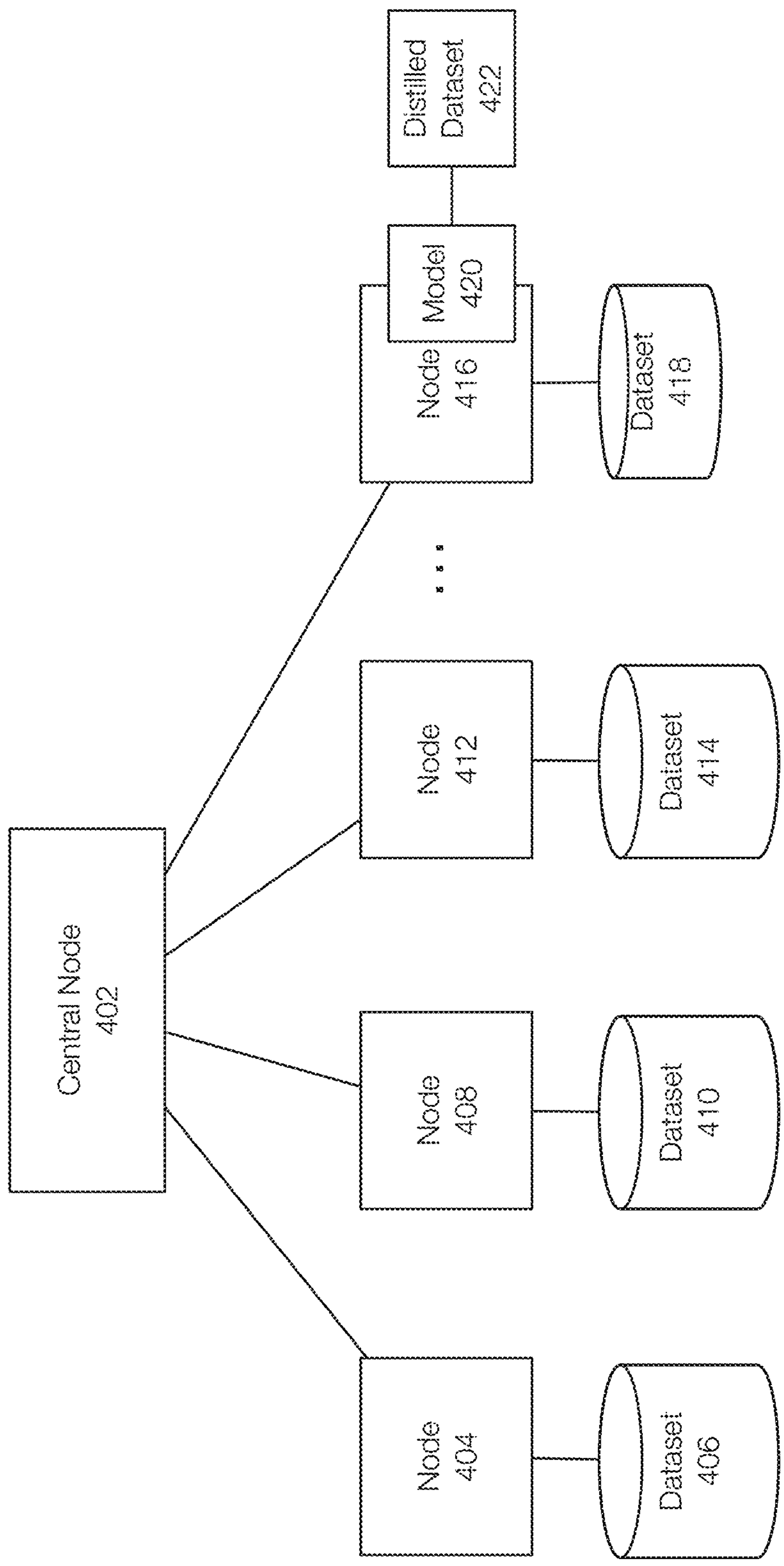
FIG. 4 discloses aspects of an environment in which federated machine learning occurs and edge nodes that have distinct and locally available data.

FIG. 4 discloses aspects of a federated machine learning environment. The central node 402 (A) may be associated with edge nodes ($E_0 \ldots E_Z$) represented by nodes 404, 408, 412, and 416. The edge nodes are associated with local datasets ($X_0 \ldots X_Z$) represented by datasets 406, 410, 414, and 418. In this example, the node 416 is a newly deployed node and has a comparatively smaller dataset 418. The dataset 418 is not sufficient for training a machine learning model in this example. Further, the datasets 406, 410, 414, and 418 may not have the same distributions and, in addition, should be kept private.

Rather than provide a bootstrap model to the node 416 and adapt the bootstrap model using locally available data, embodiments of the invention may use a distilled dataset 422, to which multiple nodes may have contributed. The distilled dataset allows a model 420 deployed to the node 416 to be trained with the distilled dataset 422. Because multiple nodes, each associated with data having a distribution (Di), contributed to the generation of the distilled dataset 422, the model 420 has a similar level of accuracy when deployed to the node 416 and the distilled dataset 422 is orders of magnitude smaller than the original training dataset. This reduces transmission requirements and saves time when training the model 420.

Embodiments of the invention further extend the generation of a federated distilled dataset to include robust aggregation. FIG. 5 discloses aspects of generating a distilled dataset with robust aggregation. The pseudocode 500 includes elements of initialization 502, model optimization 504, loss evaluation 506, and gradient computation 508.

The pseudocode 500, however, includes additional orchestration to determine which nodes receive which models for evaluation. Embodiments of the invention do not require a one-to-one correspondence of nodes to models. Thus, the same iteration of a model may be provided to multiple nodes. The pseudocode 500 also illustrates communication parameters such that less data traverses the network between the edge nodes and the central node. The pseudocode 500 also provides a robust aggregation element at 508 to determine which loss evaluations are considered and/or used for the gradient computation 508. Embodiments of the invention discard or exclude loss evaluations that are outliers or that are malicious or potentially malicious from the loss evaluation and gradient computation 508.

Figure 6:
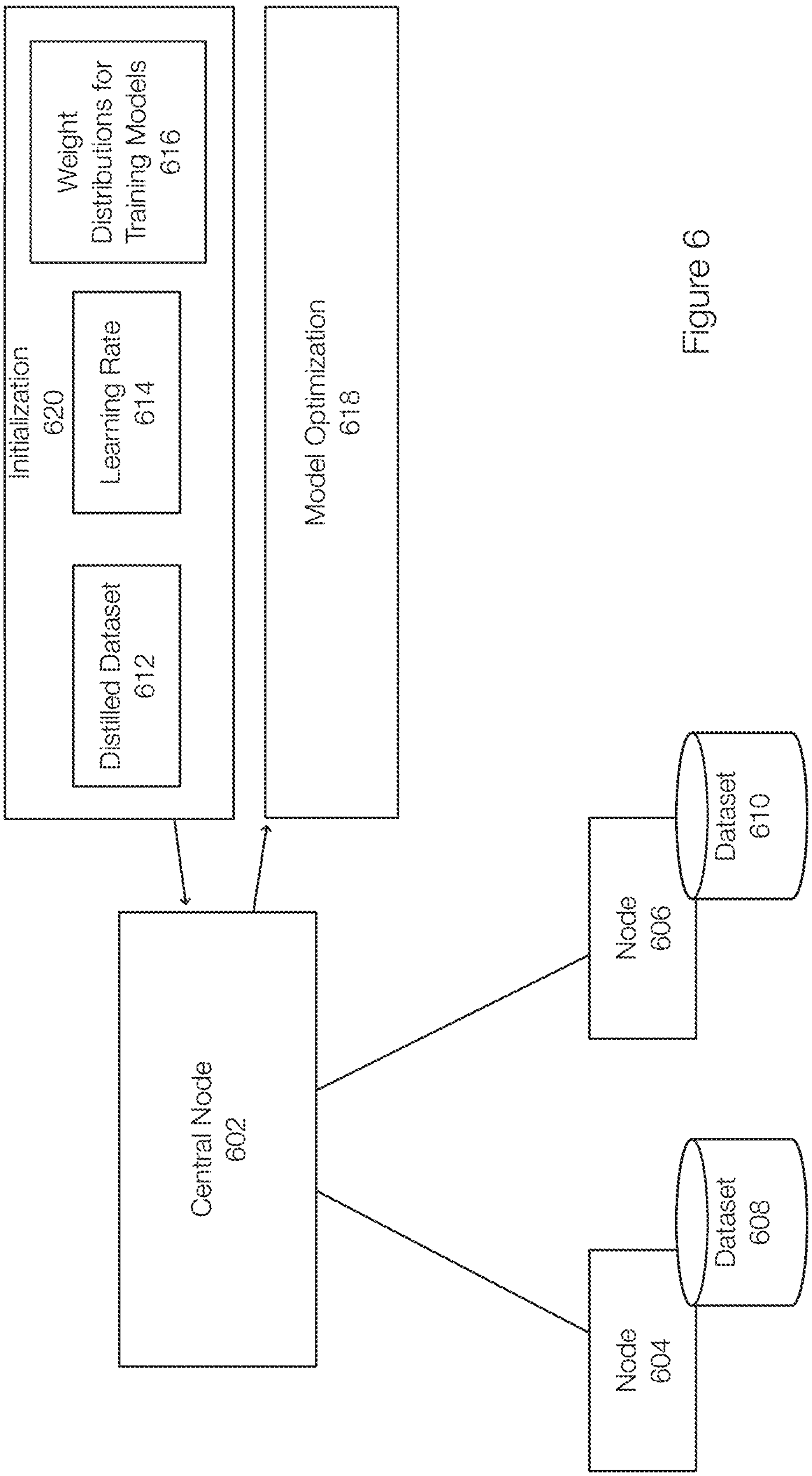
FIG. 6 discloses aspects of initialization and model optimization.

FIG. 6 discloses aspects of initialization and model optimization. FIG. 6 illustrates a central node 602 associated with nodes, represented by the nodes 604 and 606. The node 604 includes a dataset 608 and the node 606 includes a dataset 610. In this example, initialization 620 (e.g., 502 in FIG. 5) may occur at the central node 602 (A). More specifically, a randomly initialized distilled dataset 612 ($\tilde{x}$), a definition of weight distributions for training models 616 $p(\theta)$, and an initial learning rate ($\tilde{\eta}$) are provided or defined. The initial distilled dataset 612, the learning rate 614, and the weight distributions 616 may be defined at the central node 602.

Next, model optimization 618 is performed by the central node 602. In this example, model optimization 618 may include obtaining sample weights $\theta_1$ from $p(\theta)$ and determining an initial model. The model may be selected from a set of models and may be indexed by i.

Model optimization 618 may then perform a training iteration of E epochs, which adjusts the weights $$\theta_1^i$$

to obtain $$\theta_E^i.$$

This model optimization 618 is performed with respect to the randomly initialized distilled dataset 612 $\tilde{x}$ and does not require real data. The resulting weights $$(\theta_E^i)$$

may be communicated to the edge nodes for additional training. This may be performed for multiple models. The resulting model weights after optimizing multiple models, after E epochs, may be represented by $$\theta_E^a, \theta_E^b, \ldots \theta_E^z.$$

Next, the trained model weight samples (or more generally the trained models) are communicated to the edge nodes for loss evaluation. Using multiple nodes, a trained model weight sample may be sent to a set of nodes. In embodiments of the invention as previously stated, multiple nodes may each receive one or more model weight samples and some of the nodes may receive some of the same model weight samples.

Figure 7A:
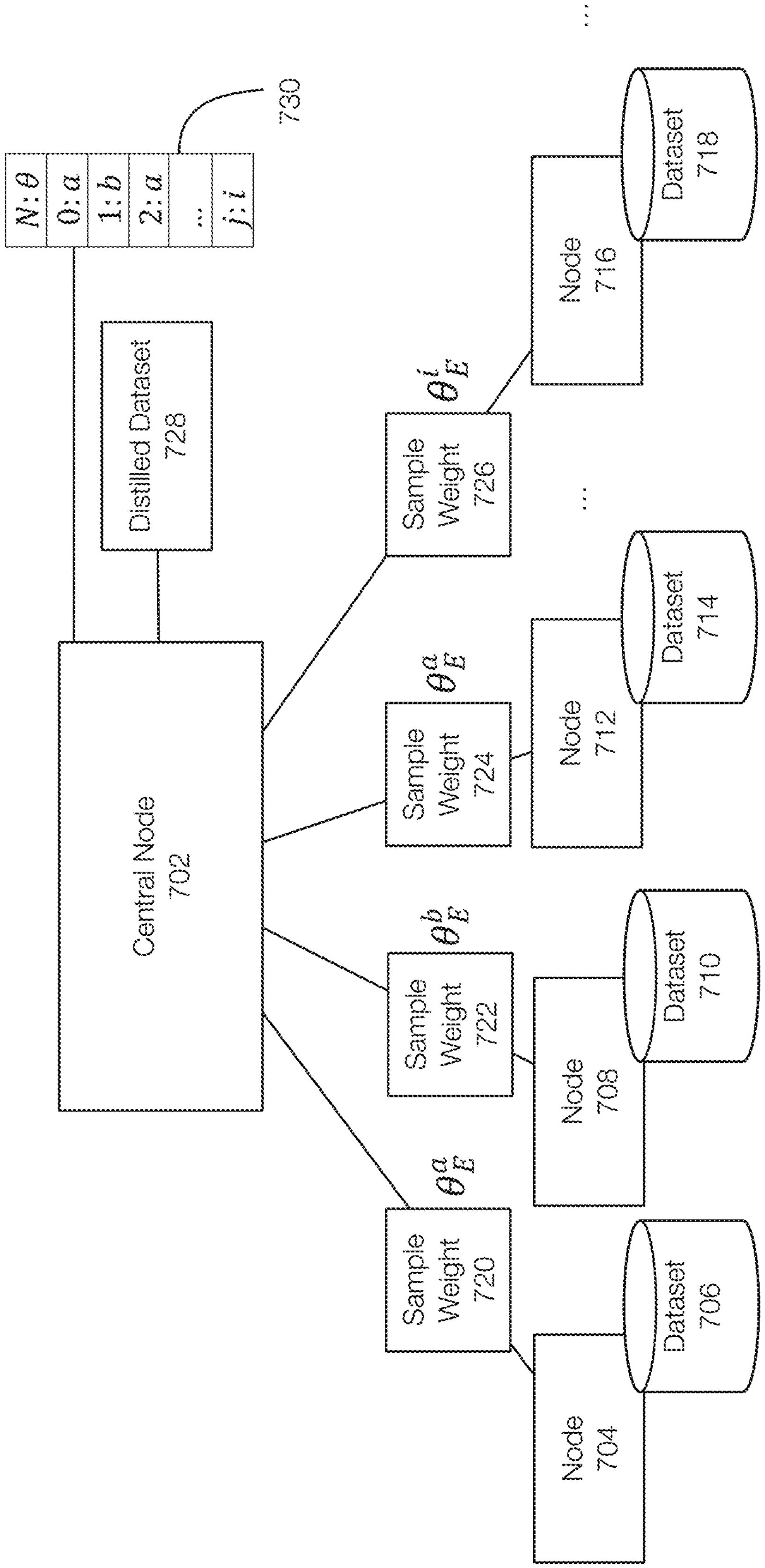
FIG. 7A illustrates model weight samples being sent to nodes in a federated learning environment.

FIG. 7A illustrates model weight samples begin sent to nodes in a federated learning environment. FIG. 7A illustrates a central node 702 and edge nodes 704, 708, 712, and 716 that have, respectively, datasets 706, 710, 714, and 718. The central node 702 distributes model sample weights 720, 722, 724, and 726 to, respectively, the nodes 704, 708, 712, and 716.

In this example, the nodes 704 and 712 (nodes 0 and 2 of nodes 0, 1, 2, . . . j . . . ) receive the model sample weights 720 and 724, which are both $$\theta_E^a$$

a model a. The node 708 (node 1) receives the sample weight 724

$$\theta_E^b$$

and the node 716 (node j) receives the sample weight 726

$$\theta_E^i.$$

Because the sample weights 720 and 724 are the same in this example, FIG. 7A illustrates that some of the nodes may receive the same sample weights. Further multiple nodes may receive multiple model sample weights or multiple models. Because there is not a one-to-one relationship of model to node, a table 730 is generated to track the Z relations between nodes and models N:θ. The table 730, at this stage identifies (see element 510 in FIG. 5) which node received which model, which is represented by Z←nodes_eval in FIG. 5 at 510.

The process for determining which nodes receive which models may be domain-dependent and may require the central node 702 to track characteristics of the nodes. Example characteristics may include, by way of example, the expected response times by the nodes, their resource availability, and/or their data availability.

In one example, this operation may be performed multiple times and each node may receive multiple versions of the model. As a result, the contents of the table 730 are amended to track this information.

When the trained model weight samples are received, each of the nodes performs a loss evaluation. More specifically, each model performs an assessment of the optimized model against real data: $x_t \subset X_i$. The loss is defined or determined using a loss function as follows:

$$L_j^i = \ell(x_t, \theta_E^i).$$

Figure 7B:
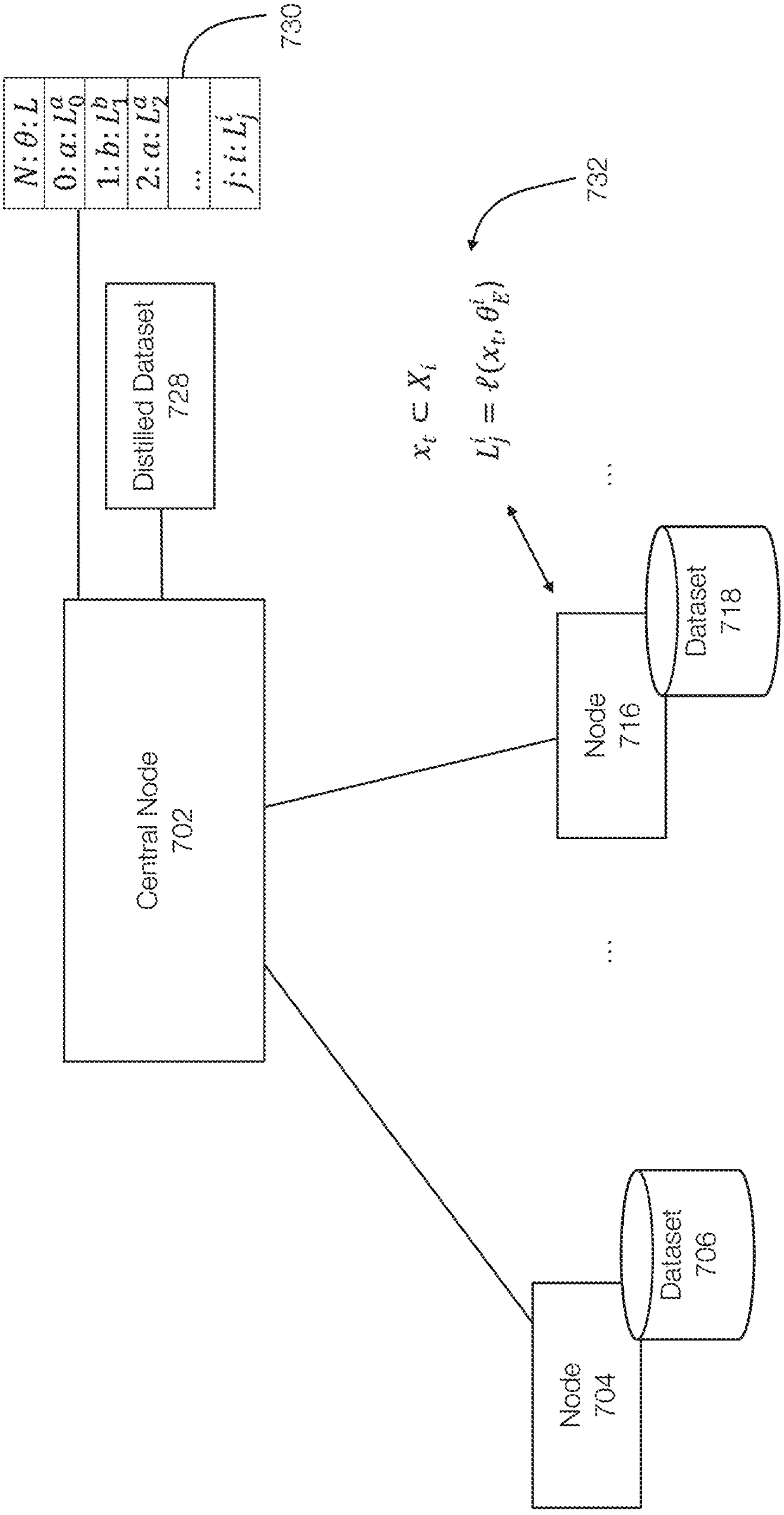
FIG. 7B discloses aspects of determining a loss for the models and the edge nodes.

FIG. 7B discloses aspects of determining a loss for the models and the edge nodes. In this example, the model architecture and loss function at each of the modes is known such that the model weights can be instantiated properly. FIG. 7B illustrates that the loss 732 is determined at the node 716 using real data from a dataset 718 of the node 716. A similar loss is determined at the other nodes for the corresponding models delivered to those nodes.

The loss 732 is communicated back to the central node 702 and the table 730 is updated. The table 730 thus stores loss values from each of the nodes. The table 730 illustrates, for example, the model a at the node 0 (node 704) had a loss of $$L_0^a.$$

At this stage, in one embodiment, the loss values are not immediately used to perform the gradient computation (e.g., to obtain the gradients ($\nabla_{\tilde{x}}$, $\nabla_{\tilde{\eta}}$) for updating, respectively, the distilled data and the learning rate) directly. Rather, the loss values are stored in the table 730 and may be processed at a later stage during robust aggregation.

Figure 7C:
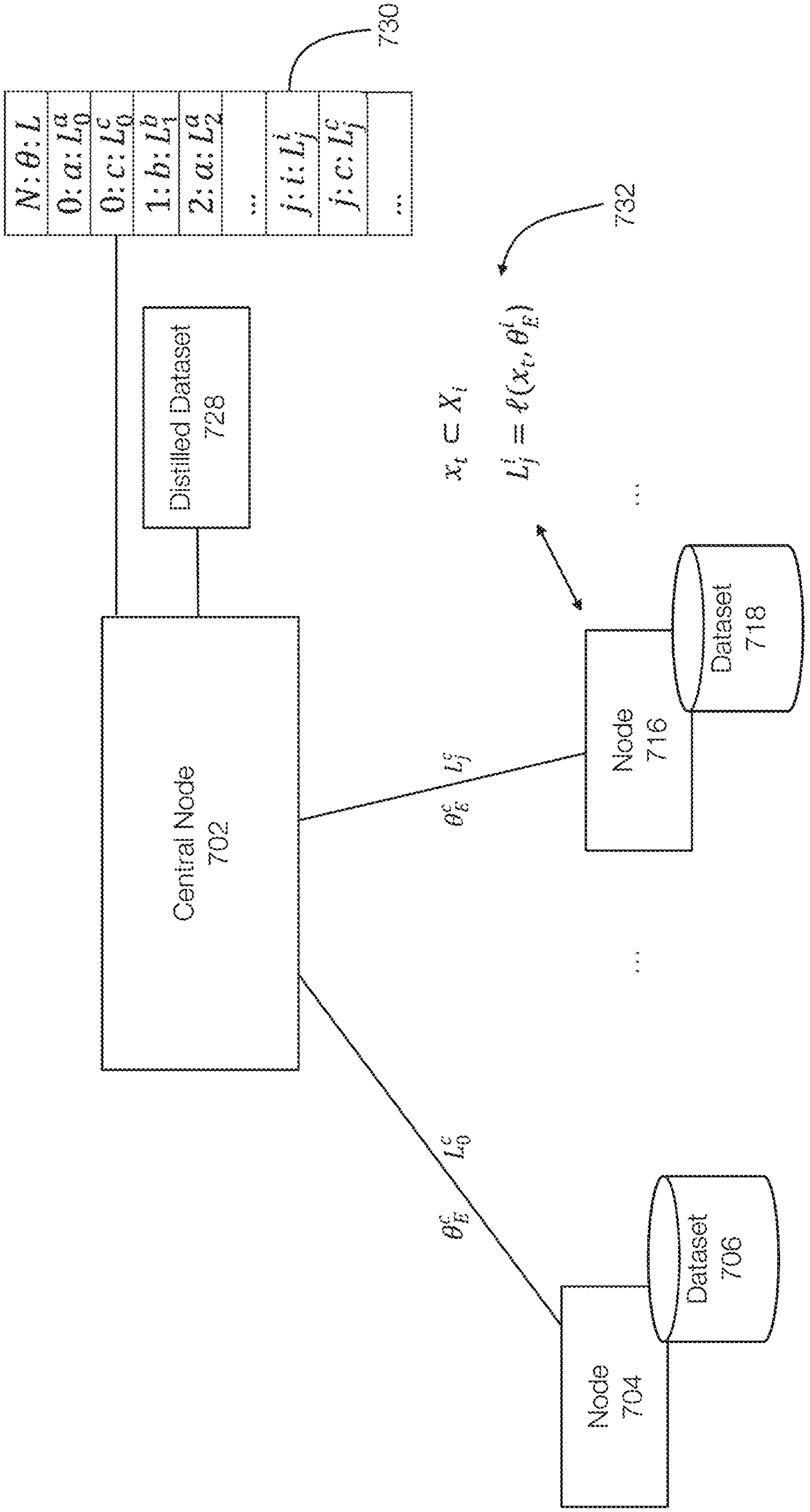
FIG. 7C discloses aspects of iteratively performing a loss evaluation.

The loss evaluation may be performed iteratively. FIG. 7C discloses aspects of iteratively performing a loss evaluation. In one example, the loss evaluation at the edge node 704, for example, only includes a forward pass in the model for the data $x_t$. As a result, the loss evaluation is often feasible in relatively resource constrained nodes. Other nodes, which may have more computing resources or power may be able to perform a loss evaluation for multiple models. FIG. 7C illustrates a second iteration where the model c or sample weights $$\theta_E^c$$

are passed to the node 704 and to the node 716. The loss evaluation values $$L_0^c \text{ and } L_j^c$$

are returned and stored in the table 730 as illustrated in FIG. 7C. As illustrated in the table 730 in FIG. 7C, there are now two entries for the nodes 0 and j. Each entry is a loss value for a different model for the nodes 0 and j.

With a large number (e.g., w) of optimized models and because each node may generate a loss value for multiple models, the number of loss evaluations may be greater than $$\frac{w}{|E|},$$

where E is the number of nodes. In one example, these iterations occur in the same training round t (e.g., in the while loop of the pseudocode 500).

Once the loss values are generated, the table 730 may be used in robust distillation and aggregation. Robust aggregation (e.g., robust aggregation (R) function in element 508 of FIG. 5) is performed. More specifically, the central node 702 has all of the models $$(\theta_E^i)$$

that can be combined with each node-model loss in the table 730 to obtain the corresponding loss and learning rate gradient for node i and model j:

$$\nabla_{\tilde{x}} L_i^j \text{ and } \nabla_{\tilde{\eta}} L_i^j.$$

In other words, for every trained model, both gradients (for model and learning rate) for all nodes assessed with that model are obtained.

Next, for each node, the loss gradients and the learning gradients are averaged as follows. For each node i and its assessed models M, the average of the loss gradients Is $$\nabla_{\tilde{x}} \overline{L_i} = \frac{1}{|M|} \sum_{j \in M} \nabla_{\tilde{x}} L_i^j$$

and the average of the learning rate gradients is $$\nabla_{\tilde{\eta}} \overline{L_i} = \frac{1}{|M|} \sum_{j \in M} \nabla_{\tilde{\eta}} L_i^j.$$

This results in two lists $\nabla_{\tilde{x}} \overline{L}_l$ and $\nabla_{\tilde{\eta}} \overline{L}_l$, with one element per node. The averaged gradients $\nabla_{\tilde{x}} \overline{L}_l$ is processed by a robust aggregation function that computes a final aggregated gradients that considers only valid gradients. Valid gradients, in one example, are the gradients considered to be inside the distribution. In one example, the robust aggregation may only consider gradients that are E standard deviations away from the mean gradient. Other examples of methods for excluding specific gradients include other outlier measures. For example, if a malicious actor attempts to interfere with the federated learning by injecting false gradients, these gradients would likely be excluded during robust aggregation.

After the method of FIG. 5 is performed, a distilled dataset is generated or obtained that is both generic (to the domain) and that ensures a high level of coherence due to the robust aggregation process. When a new node Z is deployed, the distilled data set is deployed. The model deployed to the new node is trained using the distilled dataset and/or any data that is locally available at the new node. This allows a model to be bootstrapped to the new node and sufficiently be adequately trained using the distilled dataset.

In one example, the distilled dataset, by itself, would be sufficient to obtain a generic version of a model. Leveraging local data at the new node may refine for fine-tune the model for that node. Consequently, embodiments of the invention allow a model to be deployed and trained at a new node when no or very little data is available at the node. The model may iteratively be adapted as new data becomes available at the node.

The distilled dataset is distinct from the direct deployment of a generic model trained conventionally. The distilled dataset obtained with robust aggregation is more general and coherent with the nodes in the environment and can provide a suitable starting point for model adaptation in the domain.

In one example, the concept of T rounds is eliminated and robust distillation and aggregation is performed periodically and/or continuously. This ensures that a most recent distilled dataset is available for deployment to a new node. In contrast to deploying a pre-trained model, a new node is able to receive an up-to-date starting model that can be adapted. The starting model, which is subject to periodic and/or continuous robust distillation and aggregation, reflects drift or other recent changes in data at other nodes.

Embodiments of the invention relate to a robust dataset distillation and aggregation system in which data privacy is protected and communication requirements are reduced. Embodiments of the invention can also be implemented in edge nodes that do not have the computation resources for model optimization but can perform loss evaluation. Embodiments of the invention also reduce or eliminate the impact of malicious interference and/or drift at certain nodes. Embodiments of the invention also allow nodes with more resources to provide more loss evaluations for more model parameters.

Figure 8:
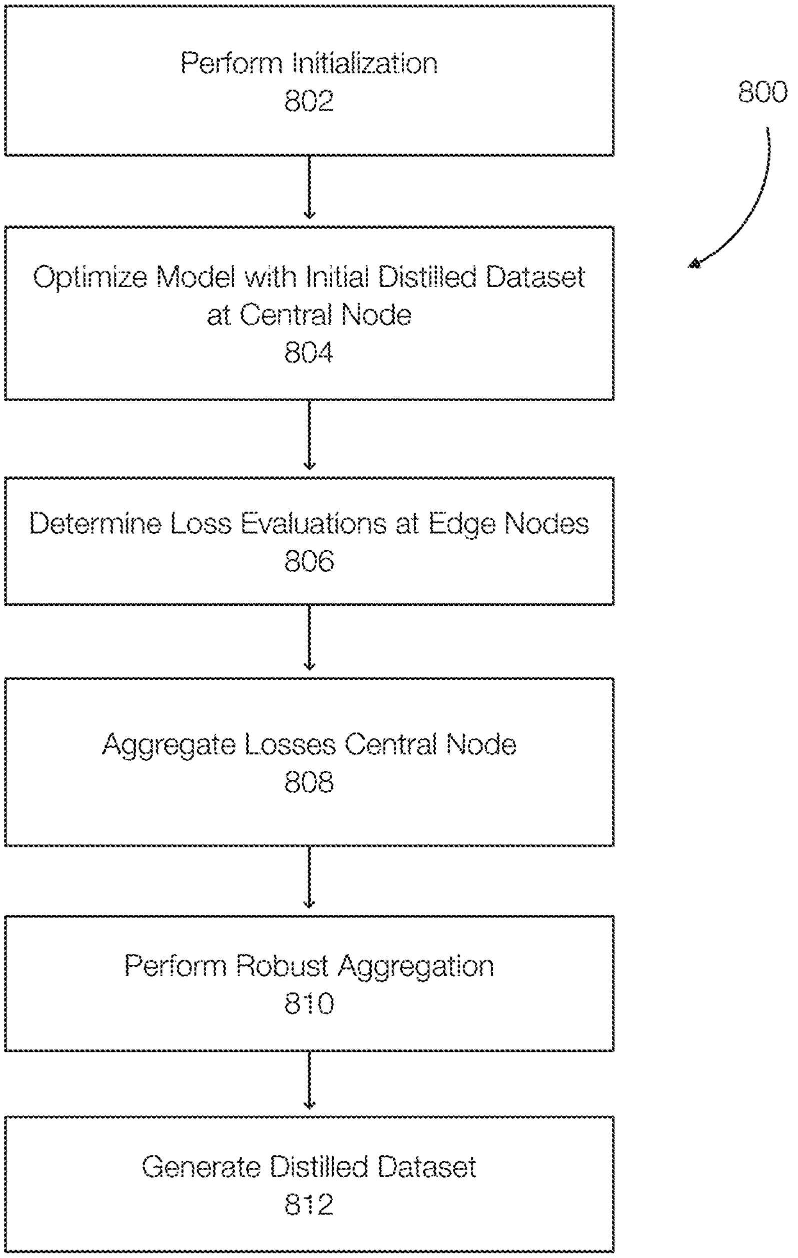
FIG. 8 discloses aspects of generating a distilled data set.

FIG. 8 discloses aspects of generating a distilled dataset. The method 800 may be performed for a number (e.g., a predetermined number) of distillation rounds. The method 800 or portions thereof may occur during each distillation round. The second round may begin with distilled dataset and learning rate that were generated during the previous round.

Initially, the method may perform 802 initializations. This may include selecting or defining an initial learning rate and may include generating a random distilled dataset. Next, for I iterations, the model is optimized 804 beginning with the random distilled dataset. Each round may optimize the model using the distilled dataset generated/updated/improved during the previous round. The optimization is performed, in one example, for multiple models in a set or distribution of models.

After the model is optimized, the model (or model weights) are transmitted to the nodes. As previously stated, embodiments of the invention can send the same model to multiple nodes and each node can participate using more than one model. After transmission of the models or the weights, loss evaluations are performed 806 at the nodes. The loss values determined at the nodes are transmitted back to the central node and stored, for example in a table. The table may store loss values for all node-model loss evaluations that were performed in the method 800.

Next, the losses are aggregated 808 at the central node. This may include generating average loss gradients and average learning rate gradients. The loss evaluations or values are, in addition, robustly aggregated 810 such that outliers, malicious values, or the like are prevented from impacting the generation of the distilled dataset. Gradients that are outliers or outside a standard deviation are excluded from use in the update. At the end of each round, the distilled dataset and/or learning rate is updated based on the robustly aggregated loss evaluations. After the final round, the distilled dataset is generated 812. The distilled dataset can be deployed with a model to new nodes. The distilled dataset accounts for distributions of data at all of the nodes and the models can be adapted or individualized at each node based on local data. The distilled dataset allows a model to be trained such that its inferences are likely to be accurate as if trained on a larger undistilled dataset. However, the distilled dataset is orders of magnitude smaller and this overcomes transmission/communication problems in a network that includes multiple edge nodes.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, machine learning operations, machine learning training operations, federated learning operations, distilled dataset generation operations, robust aggregation operations, or the like or combinations thereof. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VMs), though no particular component implementation is required for any embodiment.

It is noted that any operation(s) of any of the methods disclosed herein and in the Figures may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: initializing a distilled dataset at a central node, performing one or more rounds of: optimizing a model using the distilled dataset, communicating model weights of the optimized model to edge nodes, causing each of the nodes to generate a loss evaluation value at receiving the loss evaluation values to the central node, robustly aggregating the loss evaluation values into a robust aggregated loss evaluation gradient value, wherein loss evaluation values that are outliers are omitted from the robust aggregated loss evaluation gradient value, and updating the distilled dataset using the robust aggregated loss evaluation gradient value.

Embodiment 2. The method of embodiment 1, further comprising initializing the distilled dataset with random data.

Embodiment 3. The method of embodiment 1 and/or 2, further comprising optimizing multiple models using the distilled dataset.

Embodiment 4. The method of embodiment 1, 2, and/or 3, further comprising communicating model weights of one or more models to each of the edge nodes, wherein some of the nodes receive some of the same model weights for performing the loss evaluation.

Embodiment 5. The method of embodiment 1, 2, 3, and/or 4, further comprising generating the loss evaluation using real data at the edge nodes, wherein each of the edge nodes has different data.

Embodiment 6. The method of embodiment 1, 2, 3, 4, and/or 5, wherein robustly aggregating the loss evaluation values comprises generating an average loss evaluation for each model based on the loss evaluations for each model.

Embodiment 7. The method of embodiment 1, 2, 3, 4, 5, and/or 6, further comprising excluding loss evaluations from the robust aggregated loss evaluation gradient value that are outliers from a distribution of the loss evaluations.

Embodiment 8. The method of embodiment 1, 2, 3, 4, 5, 6, and/or 7, further comprising excluding loss evaluations from the robust aggregated loss evaluation gradient value that are more than one standard deviation from a mean loss value.

Embodiment 9. The method of embodiment 1, 2, 3, 4, 5, 6, 7, and/or 8, further comprising defining an initial learning rate and updating the learning rate in each round.

Embodiment 10. The method of embodiment 1, 2, 3, 4, 5, 6, 7, 8, and/or 9, further comprising storing the loss evaluations in a table such that the robust aggregation is performed for each round.

Embodiment 11. A system, comprising hardware and/or software, operable to perform any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
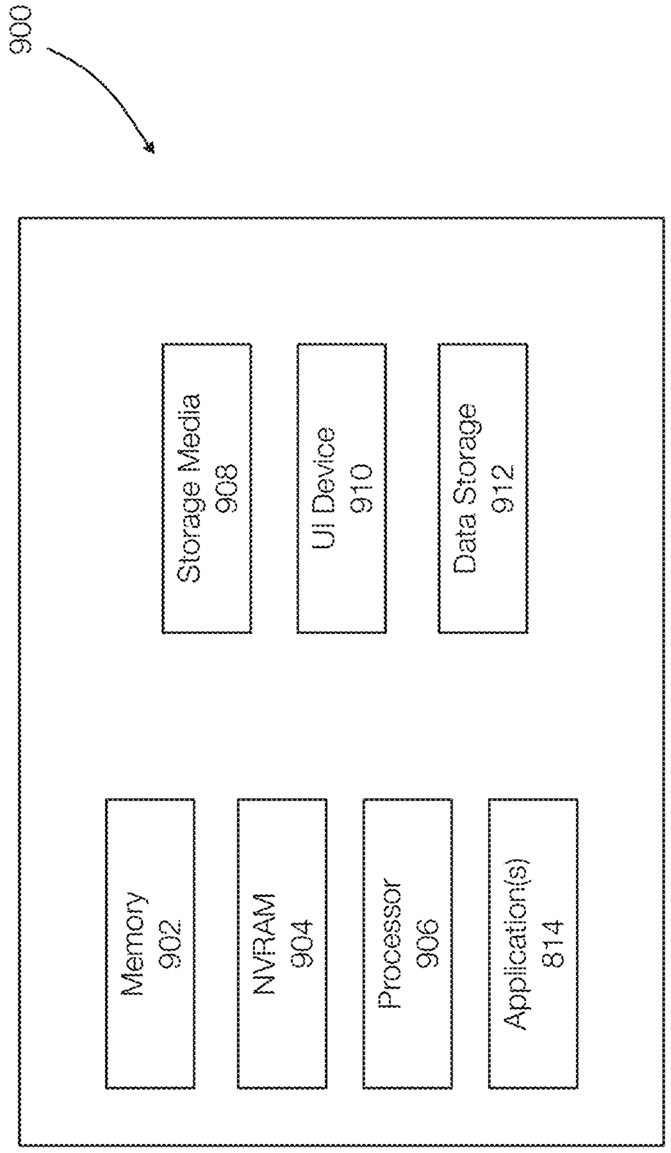
FIG. 9 discloses aspects of a computing device, system, or entity.

With reference briefly now to FIG. 9, any one or more of the entities disclosed, or implied, by the Figures, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
- initializing, at a central node, a distilled dataset comprising synthetic training data; and
- performing one or more rounds, at the central node, of:
  - optimizing a model using the distilled dataset;
  - transmitting model parameters of the optimized model to edge nodes;
  - causing each of the nodes to perform a forward inference operation using local real data and the received model parameters to generate loss evaluation values, wherein the edge nodes do not compute gradients or perform backpropagation when generating the loss evaluation values;
  - receiving the loss evaluation values generated by the edge nodes;
  - robustly aggregating the received loss evaluation values to exclude outlier loss evaluation values and to generate an aggregated loss evaluation result;
  - after robustly aggregating the received loss evaluation values, computing gradients with respect to the distilled dataset based on the aggregated loss evaluation result; and
  - updating the distilled dataset using the gradients computed with respect to the distilled dataset,
- wherein receiving only the loss evaluation values from the edge reduces exposure of parameter-level training information associated with the local real data.

2. The method of claim 1, further comprising initializing the distilled dataset with random data.

3. The method of claim 1, further comprising optimizing multiple models using the distilled dataset.

4. The method of claim 3, further comprising transmitting model parameters of one or more optimized models to each of the edge nodes, wherein some of the nodes receive some of the same model parameters for generating the loss evaluation values.

5. The method of claim 1, further comprising generating the loss evaluation values using real data at the edge nodes, wherein each of the edge nodes has different data.

6. The method of claim 1, wherein robustly aggregating the loss evaluation values comprises generating an average loss evaluation value for each optimized model based on the loss evaluations values for each optimized model.

7. The method of claim 6, further comprising excluding loss evaluations values from the robust aggregated loss evaluation result that are outliers from a distribution of the loss evaluations values.

8. The method of claim 6, further comprising excluding loss evaluations values from the robust aggregated loss evaluation result that are more than one standard deviation from a mean loss evaluation value.

9. The method of claim 1, further comprising defining an initial learning rate and updating the learning rate in each round.

10. The method of claim 1, further comprising storing the loss evaluations values in a table such that the robust aggregation is performed for each round.

11. A non-transitory storage medium having stored therein instructions that are executable by one or more hardware processors to perform operations comprising:
- initializing, at a central node, a distilled dataset comprising synthetic training data; and
- performing one or more rounds, at the central node, of:
  - optimizing a model using the distilled dataset;
  - transmitting model parameters of the optimized model to edge nodes;
  - causing each of the nodes to perform a forward inference operation using local real data and the received model parameters to generate a loss evaluation values, wherein the edge nodes do not compute gradients or perform backpropagation when generating the loss evaluation values;
  - receiving the loss evaluation values generated by the edge nodes;

robustly aggregating the received loss evaluation values to exclude outlier loss evaluation values and to generate an aggregated loss evaluation result;

after robustly aggregating the received loss evaluation values, computing gradients with respect to the distilled dataset based on the aggregated loss evaluation result; and updating the distilled dataset using the gradients computed with respect to the distilled dataset, wherein receiving only the loss evaluation values from the edge reduces exposure of parameter-level training information associated with the local real data.

12. The non-transitory storage medium of claim 11, further comprising initializing the distilled dataset with random data.

13. The non-transitory storage medium of claim 11, further comprising optimizing multiple models using the distilled dataset.

14. The non-transitory storage medium of claim 13, further comprising transmitting model parameters of one or more optimized models to each of the edge nodes, wherein some of the nodes receive some of the same model parameters for generating the loss evaluation values.

15. The non-transitory storage medium of claim 11, further comprising generating the loss evaluation values using real data at the edge nodes, wherein each of the edge nodes has different data.

16. The non-transitory storage medium of claim 11, wherein robustly aggregating the loss evaluation values comprises generating an average loss evaluation value for each optimized model based on the loss evaluations values for each optimized model.

17. The non-transitory storage medium of claim 16, further comprising excluding loss evaluations values from the robust aggregated loss evaluation result that are outliers from a distribution of the loss evaluations values.

18. The non-transitory storage medium of claim 16, further comprising excluding loss evaluations values from the robust aggregated loss evaluation result that are more than one standard deviation from a mean loss evaluation value.

19. The method of claim 1, further comprising defining an initial learning rate and updating the learning rate in each round.

20. The non-transitory storage medium of claim 11, further comprising storing the loss evaluation values in a table such that the robust aggregation is performed for each round.

* * * * *